Sept. 26, 1944.   C. B. CHENAULT   2,358,850
MALE URINAL
Filed June 26, 1942
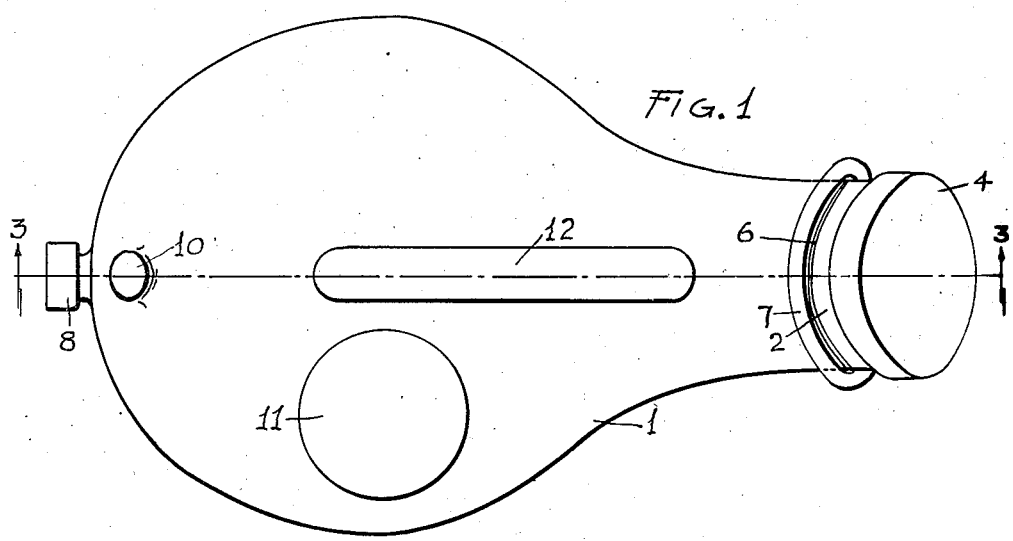
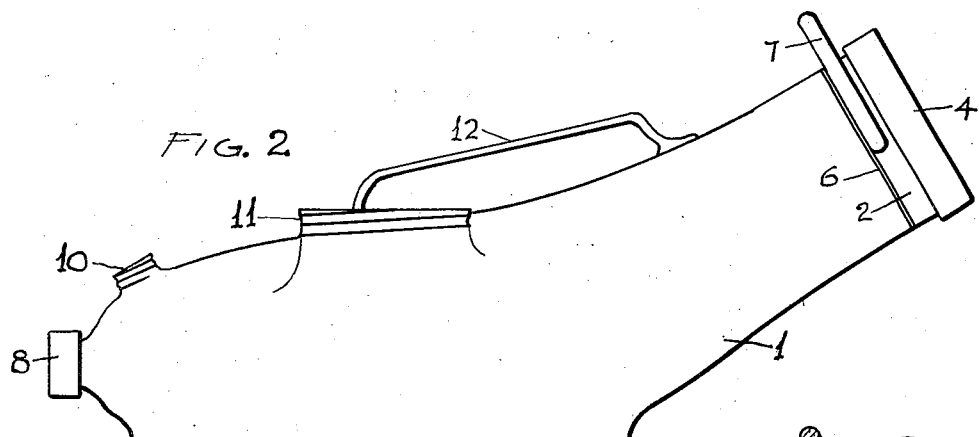
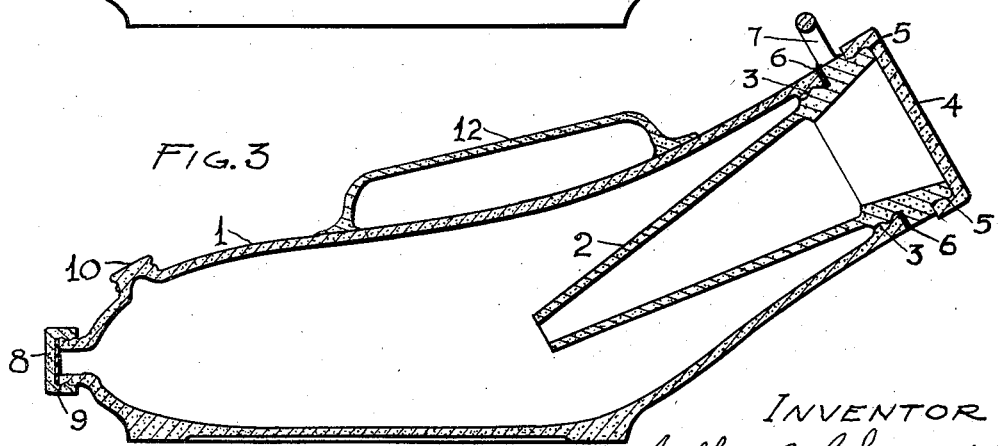
INVENTOR
Colby B. Chenault.

Patented Sept. 26, 1944

2,358,850

UNITED STATES PATENT OFFICE 2,358,850

MALE URINAL

Colby B. Chenault, Oklahoma City, Okla.

Application June 26, 1942, Serial No. 448,600

3 Claims. (Cl. 4—110)

The invention relates to improvements in male urinals in which a tubular removable insert with removable cover fits into the neck of the container; and the objects of the improvements are, first, to minimize leakage of liquid from the container; second, to provide a container of shape and construction that minimizes leakage of liquid or odor.

One form of the invention is illustrated in the accompanying drawing in which Figure 1 is a plan view of the container; Figure 2, a side view of the container; Figure 3, a vertical section of the container, and tubular trap on the line 3—3, Figure 1; container 1 receives tubular trap 2, tubular trap 2 is connected to container 1 with screw threads 3; cap 4 is connected to tubular trap 2 with screw threads 5; gasket 6 fits between tubular trap 2 and container 1; handle 7 is affixed rigidly to tubular trap 2, used in the removing and replacing of tubular trap 2; cap 8 covers hose opening in container 1, and is fastened to container 1 by screw threads 9; lug 10 is to receive cap 8 when not in use; lug 11 is to receive cap 4 when not in use; handle 12 is affixed rigidly to container 1.

I am aware that prior to my invention male urinals have been made with openings on an incline to the container. I therefore do not claim such a combination broadly; but I claim:

1. In a device of the class described, a container with an inclined neck, a handle for the said container, a tubular trap adapted to seat within the said neck and extend downward therein, thread means adjacent the enlarged upper end of the said tubular trap adapted to secure the said trap within the inclined neck of the container, a gasket for seating between the container and trap, an integral handle for the tubular trap and means for closing the enlarged upper end of the said trap.

2. In a urinal of the class described, the combination of a flask-shaped container with an inclined neck and suitable handle, a screw cap cover for a hose opening on the end of the said container opposite the inclined neck, an integral lug on the container adjacent the hose opening adapted to receive the said screw cap cover when not in use, a funnel-shaped tubular trap adapted for seating in the said inclined neck, screw thread means on the container and trap for holding them together, gasket means adapted to seal the joint therebetween, an integral handle for the said tubular trap, a screw cap adapted to close the enlarged upper end of the said trap, and an integral lug on the said container adapted to secure the said last named screw cap when not in use as a closing means.

3. The combination, in a male urinal, of a flask-like container having an opening at one end adapted for connecting a hose, a threaded cap for said opening, an integral lug on the said container for the said cap to avoid misplacement when not used as a closure means, a handle for the said container, an inclined neck on the said container opposite the said hose connection, a conical tubular trap adapted for seating within the said inclined neck, screw thread and gasket means for securing the said trap and container together, cover means for closing the said trap against odor and an integral lug on the said container for securing the said cover when not used as a closure.

COLBY B. CHENAULT.